United States Patent [19]

Miller

[11] Patent Number: 4,691,797
[45] Date of Patent: Sep. 8, 1987

[54] FLUID FLOW CONTROL APPARATUS FOR A POWER STEERING SYSTEM

[75] Inventor: Laurence L. Miller, W. Lafayette, Ind.

[73] Assignee: TRW Inc., Cleveland, Ohio

[21] Appl. No.: 883,931

[22] Filed: Jul. 10, 1986

[51] Int. Cl.[4] .................................................. B62D 5/08
[52] U.S. Cl. .................................... 180/143; 180/141
[58] Field of Search ..................... 180/141, 142, 143

[56] References Cited

U.S. PATENT DOCUMENTS

| | | | |
|---|---|---|---|
| 3,384,020 | 5/1968 | Searle | 180/142 |
| 4,300,650 | 11/1981 | Weber | 180/143 |
| 4,320,812 | 3/1982 | Takaoka et al. | 180/143 |
| 4,513,835 | 4/1985 | Funkino et al. | 180/142 |
| 4,570,662 | 2/1986 | Anderson | 137/115 |
| 4,570,667 | 2/1986 | Masica et al. | 137/117 |
| 4,574,905 | 3/1986 | Asano et al. | 180/142 |
| 4,619,339 | 10/1986 | Fotaba et al. | 180/143 |

OTHER PUBLICATIONS

U.S. Ser. No. 738,601, Cage et al., filed May 28, 1985.
SAE Paper No. 841198, "Development of an Electronically Controlled Power Steering System", by Yamaguchi et al., Oct. 1, 1984.
SAE Paper No. 700881, "A New Power Steering Pump for Heavy Duty Trucks", by C. A. Searle, Nov. 4, 1970.

*Primary Examiner*—John J. Love
*Assistant Examiner*—Donn McGiehan
*Attorney, Agent, or Firm*—Tarolli, Sundheim & Covell

[57] ABSTRACT

A power steering system includes a hydraulic pump and a hydraulic steering mechanism. A flow control orifice passes fluid from the pump to the steering mechanism and generates a hydraulic control signal proportional to the fluid flow rate therethrough. A flow control valve is connected between the pump to bypass fluid away from the steering mechanism in response to the hydraulic control signal. A solenoid operated valve is located in a pilot fluid circuit between the pump and the flow control orifice to vary the hydraulic control signal in response to an electrical control signal. The electrical control signal is a pulse width modulated signal having a duty cycle proportional to vehicle speed. Maximum power assist occurs when vehicle speed is below a predetermined value and decreases with increasing vehicle speed above the predetermined value.

8 Claims, 2 Drawing Figures

FLUID FLOW CONTROL APPARATUS FOR A POWER STEERING SYSTEM

TECHNICAL FIELD

The present invention relates to a power steering system, and particularly to a fluid flow control apparatus for controlling fluid flow from a power steering pump to a power steering mechanism of a vehicle.

BACKGROUND OF THE INVENTION

Known power steering systems include a power steering pump, a valve actuated upon turning of the vehicle steering wheel, and a power steering motor for moving the vehicle wheels in response to actuation of the valve. The pump is driven from the engine. When the engine is operating at a relatively low speed (revolutions per minute), the pump must deliver sufficient fluid at the pressure created by the steering load to power the steering motor and steer the vehicle wheels.

A typical truck steering pump delivers 3.6 gallons per minute at an engine speed of 600 rpm. At an engine speed of 3000 rpm, the same pump would deliver 18 gallons per minute. Such a fluid flow rate would create a high pressure drop across the steering valve and consume horsepower. To avoid this problem, for years pumps used in power steering systems have been provided with flow control valves which operate to bypass excess fluid flow delivered from the pump directly to tank.

Known flow control valves are controlled by fluid pressure forces. Fluid from the pump flows through a flow control orifice to the power steering valve. The pressure drop across the orifice is communicated to the flow control valve. As pump outlet flow increases and more flow passes through the orifice, the pressure drop across the flow control valve increases. When the force created by the pressure drop across the valve exceeds the spring force holding the valve closed, the valve will open and bypass flow to return. When pump flow decreases due to increased system pressure, the pressure drop across the flow control valve decreases and the flow control valve closes to bypass less fluid to return. In this way, the flow control valve tends to maintain a constant pressure drop across the flow control orifice and thus constant flow to the system. There are many patents relating to flow control valves and their controls. U.S. Pat. Nos. 3,384,020 and 4,513,835 are typical examples of such patents.

A power steering system is described in SAE Technical Paper Series No. 841198 dated Oct. 1, 1984 entitled "Development of an Electronically-Controlled Power Steering System." The described system includes a flow control valve for bypassing flow directly from the power steering pump to tank. The flow control valve includes a solenoid actuated valve member. The valve member is moved to control the amount of fluid bypassed according to vehicle speed.

In the power steering system described in the SAE Paper No. 841198, the flow control valve must be a relatively large valve to bypass substantial amounts of hydraulic fluid. Therefore, a relatively large solenoid must be used to control the valve member. A large solenoid requires relatively high operating current. Solenoid operated valves having a large solenoid typically have a slow response time and an undesirably large operating hysteresis. Also, such large solenoid valves are relatively expensive.

Some power assist steering systems control power assist in response to vehicle speed. During operation of a vehicle at a relatively low speed, there is a relatively large resistance to turning movement of the vehicle wheels. It is desirable to provide maximum power assist for such low speed maneuvering. As vehicle speed increases, resistence to turning movement of the vehicle wheels decreases. Therefore, as the vehicle speed increases, less power assist is needed to provide an acceptable steering "feel" for the operator. One power assist system has been developed to bypass fluid directly from a pump to a resevoir wherein the amount of fluid bypassed is controlled in response to the vehicle speed. This power assist steering system is disclosed in copending U.S. patent application Ser. No. 738,601, and is assigned to the assignee of the subject application.

SUMMARY OF THE PRESENT INVENTION

The present invention provides a new and improved fluid flow control apparatus for a power steering system. In the system, hydraulic fluid from a pump flows through a flow control orifice to a hydraulic steering mechanism. The flow control orifice creates a hydraulic pressure drop signal proportional to the rate of fluid flow therethrough. A flow control valve bypasses fluid in response to the hydraulic pressure drop signal. A control circuit is provided to modify the hydraulic pressure drop signal in response to an electronic control or a load sensing signal.

An apparatus for controlling fluid flow from a pump to a power steering mechanism, in accordance with the present invention, comprises orifice means, through which fluid from the pump flows to the steering mechanism, for generating a hydraulic control signal proportional to the fluid flow rate through the orifice means, flow control valve means for bypassing fluid flow in response to the hydraulic pressure drop signal, and control means for modifying the hydraulic pressure drop signal in response to a secondary control signal. In one embodiment of the invention, the secondary control signal is an electrical signal having a characteristic responsive to vehicle operating conditions. The control means varies the power assist available to aid in a steering maneuver as vehicle operating conditions vary. Some vehicle operating conditions that may be used to vary steering power assist are speed, lateral acceleration, yaw rate and acceleration.

In accordance with a preferred embodiment of the present invention, a bypass flow control valve is controlled (i) in response to the fluid flow rate through a flow control orifice in the main fluid conduit which communicates the pump with the power steering motor and (ii) in response to the pressure drop created by a small pilot fluid flow from the outlet of the pump through a variable orifice and two fixed orifices in series before rejoining the fluid in the main flow conduit. The pilot fluid flow is controlled in response to vehicle operating conditions. The maximum pilot fluid flow rate is approximately one half gallon per minute, whereas the maximum pump flow may be as high as 20 gallons per minute. A solenoid actuated valve is located in the pilot fluid conduit and controls fluid flow through the pilot fluid conduit by regulating the size of an orifice. The solenoid actuated valve in the pilot fluid conduit may be a relatively small valve, since it controls only a relatively small amount of fluid flow. Thus, the soleniod to operate the valve is substantially smaller than that required to operate other known fluid flow control bypass valves.

The solenoid actuated valve, in accordance with the present invention, is controlled in response to vehicle speed. At low vehicle speeds, the solenoid actuated valve is fully opened. When the solenoid valve is fully opened, the pressure drop across the flow control orifice is the greatest and the greatest fluid flow exists. As vehicle speed increases, the solenoid valve progressively closes. This results in a decrease in the pressure drop across the flow control orifice and a decrease in the amount of fluid flow through the orifice. Also, as vehicle speed increases, more flow is bypassed by the bypass valve at a given engine speed. Thus, available power assist is reduced as vehicle speed increases.

BRIEF DESCRIPTION OF THE DRAWINGS

Further features and advantages of the present invention will be apparent to those skilled in the art to which it relates from reading the detailed description of a preferred embodiment thereof with reference to the accompanying drawings in which.

DESCRIPTION OF PREFERRED EMBODIMENT

Figure 1:
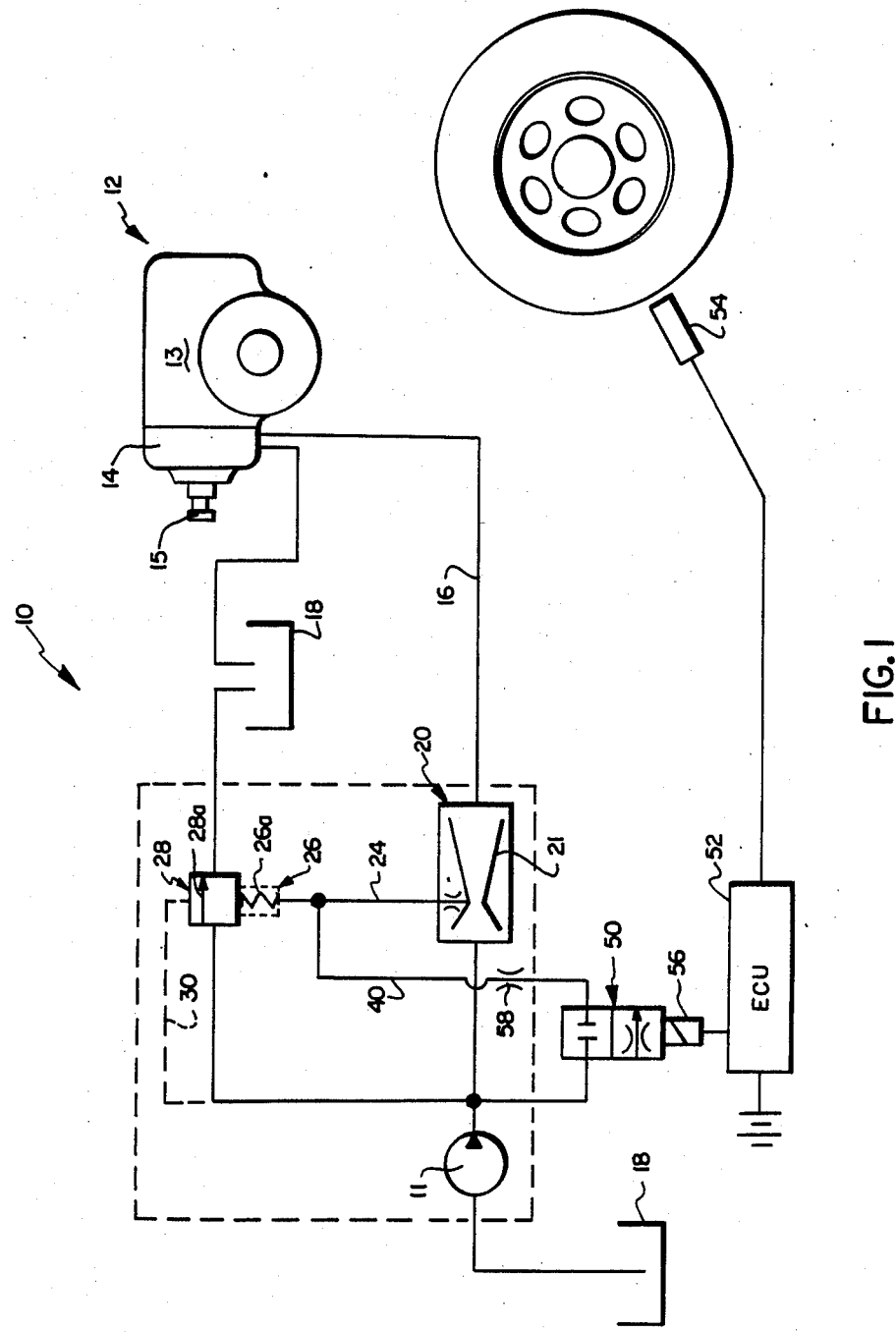
FIG. 1 is a schematic view of a power steering system embodying the present invention.

The present invention is embodied in a power steering system designated 10 in FIG. 1. The power steering system 10 includes a power steering pump 11 and a power steering mechanism 12. The power steering pump 11 is driven from the engine of the vehicle. Fluid flow from the pump 11 increases as engine revolutions per minute increase. The power steering pump may be of any specific construction but preferably is a vane pump.

The power steering mechanism 12 can be one of several types known in the art. One such mechanism is fully described in detail in U.S. Pat. No. 3,606,819 to Venable, et al. The power steering mechanism 12 includes a hydraulic power steering motor 13 and a valve 14. The power steering motor 13, when operated, effects movement of the wheels of the vehicle through suitable mechanical linkage (not shown). The motor 13 is actuated by the valve 14 which is operated on turning of an input shaft 15 connected with the steering wheel of the vehicle. The valve 14 is an open-center valve. Thus, when the valve 14 is not actuated (nonsteering), fluid flows from the pump 11 through a main fluid conduit 16 and the valve 14 to tank, schematically illustrated at 18.

A flow control orifice 20 is associated with the pump 11. Fluid flowing from the pump 11 flows through the flow control orifice 20 to the power steering valve 14 through the main conduit 16. The orifice 20 may take a variety of different conventional forms. The orifice 20 may be a thin plate or thick plate flow control orifice. The orifice 20 is illustrated in FIG. 1 as a venturi orifice, such as shown in the above-mentioned U.S. Pat. No. 3,384,020.

Flow through the venturi orifice 20 creates a pressure drop at the throat of the venturi that is less than the pressure at the entrance to the venturi 20. This pressure difference is communicated via a conduit 24 to a spring cavity 26 of a flow control bypass valve 28 and via a conduit 30 to the opposite end of flow control bypass valve 28. A spring 26a in the spring cavity 26 acts with the pressure in the spring cavity 26 to urge the bypass valve member, represented by arrow 28a, into a closed position that prevents bypassing fluid from the pump outlet to tank 18.

The bypass valve 28 is of conventional construction and is illustrated in the above-mentioned U.S. Pat. No. 3,384,020. The bypass valve 28 includes the bypass valve member 28a. The bypass valve member 28a has the fluid outlet pressure of the pump acting on one side thereof through conduit 30. This fluid pressure acts to move the bypass valve member 28a into a position which directly bypasses outlet flow from the pump 11 to tank 18. The spring 26a and the pressure in cavity 26 acts to move the bypass valve member 28a in a direction to bypass less fluid. As the pressure in the cavity 26 decreases relative to pressure in conduit 30, more fluid is bypassed directly from the outlet of the pump 11 to the tank 18. As the pressure in spring cavity 26 increases, less fluid is bypassed.

The system 10 is designed so that the power steering pump 11 provides enough flow to the valve 14 to enable actuation of the power steering mechanism 12 at low vehicle speeds. At an engine speed of approximately 600 rpm, the power steering pump 11 outputs 3.6 gallons per minute which is adequate to provide steering for the vehicle. That same pump will output 18 gallons per minute at an engine speed of 3,000 rpm. Accordingly, a significant amount of fluid must be bypassed away from the power steering mechanism at the higher engine speeds. That is the function of the bypass valve 28.

In accordance with the present invention, a pilot fluid conduit 40 communicates with the outlet of the pump 11 and with the conduit 24 which communicates the hydraulic pressure signal at the throat of the venturi orifice 20 with the spring cavity 26. An increase in fluid flow through the pilot fluid conduit 40 effects an increase in the pressure in the spring cavity 26 and thus causes the bypass valve 28 to bypass less fluid.

A solenoid operated valve 50 connectes to the pilot conduit 40. The solenoid valve 50 is shown schematically in the drawings as a valve separated from the pump 11 but it could be integrated into the housing of the pump 11. The solenoid valve 50 is a proportional valve and is controllable by a pulse width modulated electrical signal. The valve 50 is shown in FIG. 1 schematically in its off condition blocking fluid flow through the conduit 40. When in the off condition, fluid flow through the orifice 20 controls the position of the bypass valve member 28a.

The valve 50 is movable to provide a controlled amount of pilot fluid flow through conduit 40. An electronic control unit 52 is connected to a vehicle speed sensor 54 and to a solenoid 56 of the solenoid valve 50. The speed sensor 54 can be one of several known sensors that monitor vehicle speed and generate an electrical signal having a frequency proportional to the vehicle speed. The electronic control unit 52 processes the speed signal from the speed sensor 54 and generates a pulse width modulated control signal which controls the valve 50 via the solenoid 56.

The conversion of a speed signal into a pulse width modulated signal having a duty cycle responsive to the speed signal is old art. Briefly, the electronic control unit 52 can include a microcomputer having a central processing unit ("CPU") and eraseable programmable, read only memory ("EPROM"). The EPROM can include conversion tables for relating vehicle speed to duty cycle of the pulse width modulated control signal. The electronic control unit determines vehicle speed from the output signal of the speed sensor 54. The microcomputer then retrieves a value for the duty cycle from the conversion table corresponding to the determined vehicle speed. A pulse width modulated signal generator is controlled by the microcomputer responsive to the retrieved value from the conversion table.

The pulse width modulated output signal from the electronic control unit 52 has a constant frequency with the width of the on time varying in response to the sensed vehicle speed. The degree of the on or off condition of the valve 50 is responsive to the percentage of on time of the pulse width modulated control signal. It is preferable that the relationship between the pulse width modulated control signal and the fluid flow rate to the steering mechanism 12 be linear.

At low vehicle speeds, the pulse width modulated control signal maintains the valve 50 in a fully open condition. With the valve 50 fully opened, the pump pressure is communicated with the chamber 26 which moves the bypass valve member 28a to a full blocking position. The full pump outlet flow is directed to the power steering mechanism 12 with little or no fluid being bypassed. With the valve 50 fully opened, maximum power assist is available to aid in a steering maneuver. The amount of flow through the valve 50, when in a full open condition, is approximately one half gallon per minute, which is approximately 10%–15% of the total amount of fluid flow from the pump 11 when the vehicle engine is at idle.

As vehicle speed increases, the solenoid valve 50 is progressively closed. At a predetermined high vehicle speed, the valve 50 is fully closed and maximum fluid flow from the pump 11 will be bypassed. When the valve 50 is fully closed, minimum power assist is available to aid in a steering maneuver. The effect of the valve 50 in combination with the control 52 is to provide for a decreasing power assistance with increasing vehicle speed. The electronic control unit 52 can be programmed to yield a variety of possible relationships between vehicle speed and flow rate to the steering mechanism 12.

One design of the solenoid operated valve 50 contemplates that the valve will be fully closed if the on time of the pulse width modulated control signal is 20% or less and fully opened if the on time of the pulse width modulated control signal is 80% or greater. The relationship between the flow rate in conduit 16 and the on time of the pulse width modulated control signal between 20–80% is preferably linear.

An orifice 58 is located between the valve 50 and the conduit 24. The orifice 58 is smaller than the full open condition of the valve 50. When the valve 50 is in a full open condition, the orifice 58 controls the position of the bypass valve 28.

The valve 50 does not act upon a large volume of fluid flow and thus can be a relatively small valve. Since the valve 50 can be relatively small, the solenoid needed to control the valve can be small. Also, since the valve is small, there is a low amount of hysteresis and a very fast response time as compared to previous flow control systems.

Figure 2:
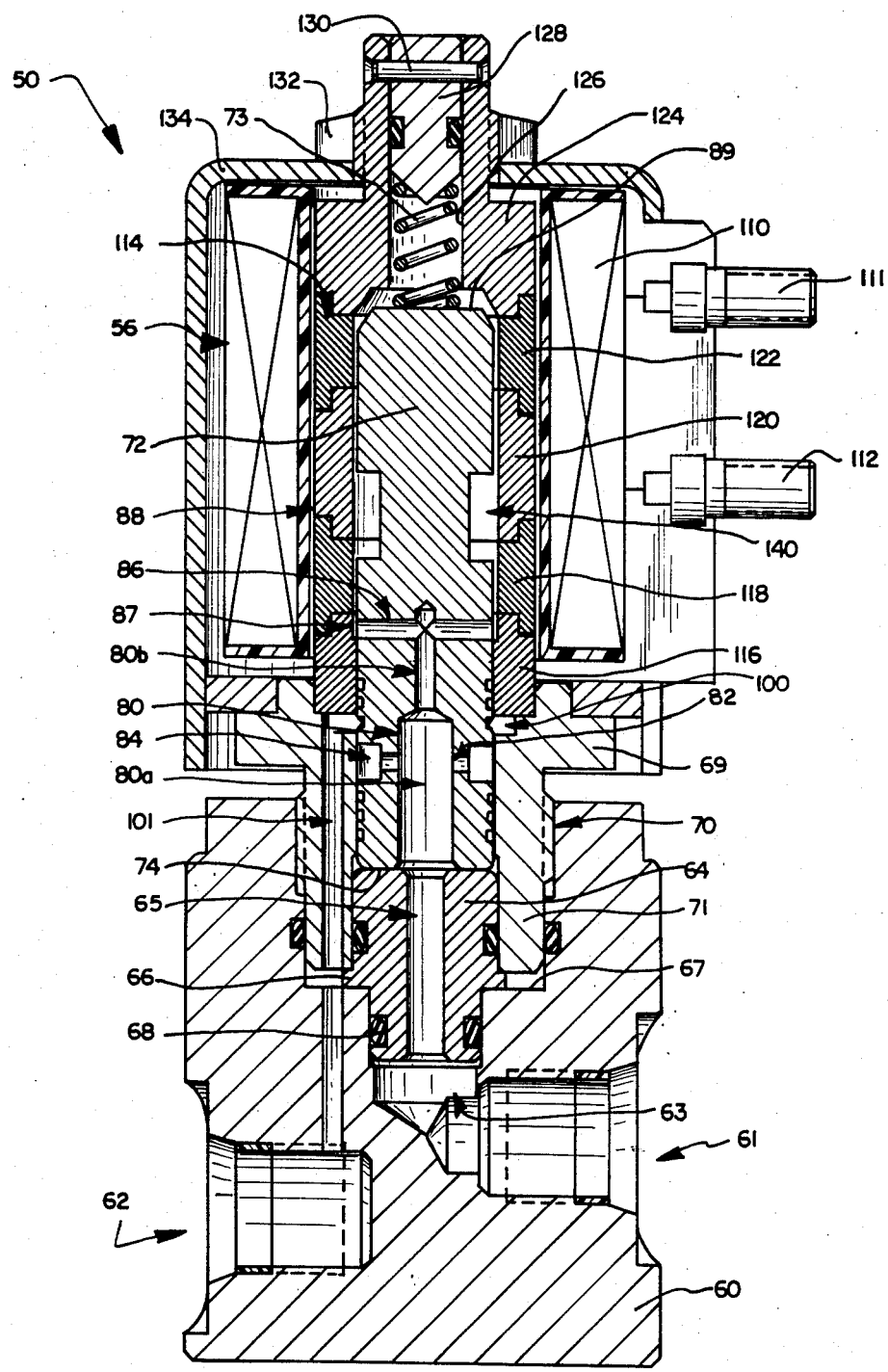
FIG. 2 is a cross sectional view of a valve used in the system of FIG. 1.

The construction of valve 50 will be better appreciated with reference to FIG. 2. The valve 50 includes a valve body 60 having an inlet 61 in fluid communication with the pump 11. The valve body 60 also has an outlet 62 in fluid communication with the spring cavity 26. Fluid from the pump 11 flows into the inlet 61 and into a central chamber 63 located in the valve body 60.

A spool stop 64 is located in the chamber 63 and has a passageway 65 which is shown as extending vertically centrally thereof. The spool stop 64 has a flange portion 66 which projects radially thereof and engages a surface 67 on the valve body 60. An O-ring seal 68 is provided between the spool stop 64 and the surface defining the chamber 63 to prevent fluid leakage around the spool stop 64. An annular clamp member 69 is threadedly engaged at 70 with the valve body 60. The member 69 has a nose portion 71 which engages the upper portion of the flange 66 and clamps the spool stop 64 in position in the valve body 60.

The valve member 50 includes a spool 72 which moves vertically as viewed in FIG. 2 to control flow of fluid between the inlet 61 and the outlet 62. The spool 72 is spring biased by a spring 73 downwardly, as viewed in FIG. 2, and one end 74 of the spool 72 engages the upper end of the spool stop 64. The end 74 of the spool 72 has a ridge thereon that provides clearance between the upper surface of the spool stop 64 and the lower end 74 of the spool 72. This clearance enables fluid to act on the surface 74 of the spool 72 for purposes of pressure balancing which will be further discussed below.

The spool 72 has a central passageway 80 therethrough which includes an enlarged portion 80a and a reduced cross sectional portion 80b. The enlarged cross sectional portion 80a communicates with a plurality of transverse openings 82 which direct fluid radially outward to an annulus 84 defined by the spool 72 and the member 69. The reduced cross sectional portion 80b of the central passageway 80 also communicates with radially extending passages 86 which, in turn, communicate with a clearance area 87 between the outer perimeter of the spool 72 and a sleeve assembly generally designated 88. The clearance enables fluid to flow along the outer portion of the spool 72 and to an upper end 89 of the spool 72. This fluid thus acts to pressure balance the spool 72 in opposition to the fluid which acts on the spool end 74.

If the spool 72 is moved vertically, the passages 82 and annulus 84 communicate with an annulus 100. The annulus 100 communicates with a plurality of vertical passages 101 which communicate fluid to the outlet 62. Thus, by controlling the position of the spool 72, fluid flow from the inlet 61 to the outlet 62 can be controlled.

The position of the spool 72 is controlled by energization of the solenoid 56. A solenoid coil 110 encircles the sleeve assembly 88. The coil 110 is electrically connected to the electronic control unit 52 by connection terminals 111, 112. When the pulse width modulated control signal is applied to the coil 110, a magnetic field is created.

The sleeve assembly 88 is made up of a plurality of rings 114 which are brazed together. A lowermost ring 116 is made of magnetic material. An adjacent ring 118 is made of a nonmagnetic material and is brazed to the ring 116. A next vertical ring 120 is made of a magnetic material and is brazed to the ring 118. Another ring 122 is made from a nonmagnetic material and is brazed to the ring 120. An uppermost ring 124 is made of magnetic material and is brazed to ring 122.

The ring 124 has a passage 126 therein. The spring 73 is located in the passage 126. The spring 73 is bottomed out on a spring stop 128 which is secured in the passage 116 by a pin 130. A nut 132 threadedly engages the outer portion of the ring 124 and clamps the sleeve assembly 114 in position relative to a shell 134 surrounding the solenoid. The ring 124 functions as an end stop for vertical movement of the spool 72.

The spool 72 includes an annular recess portion 140. When no electrical signal is applied to the solenoid 56, the spring 73 biases the spool 72 against the spool stop 64 thereby blocking fluid communication between the inlet 61 and outlet 62. Upon energization of the solenoid 56 by application of a pulse width modulated control signal from the electronic control unit 52 to the coil 110, two magnetic flux paths are created in the spool 72. One such flux path goes from the coil 110, through the ring 120, through the spool 72, through the ring 124 and back to the coil 110. The other flux path is from the coil 110, through the ring 120, through the spool 72, through the ring 116 and back to the coil 110. The rings 116, 118, 120, 122 and 124 in combination with the spool 72 and the recess 140 shapes the magnetic field such that the spool 72 is moved vertically upward, as seen in FIG. 2, an amount proportional to the on time of the pulse width modulated control signal. The spool 72 is fluid pressure balanced by fluid acting on both surfaces 74 and 89 of the spool 72. The position of spool 72 is then controlled by the force of the spring 73 acting against the forces created by the magnetic field which is controlled by the pulse width modulated control signal outputted from the electronic control unit 52.

It should be apparent that applicant has provided a new and improved power steering system and that certain changes and modifications may be made therein by one skilled in the art, and it is intended to cover such changes and modifications coming within the scope of the appended claims.

Having described a specific preferred embodiment of the invention, the following is claimed:

1. An apparatus for controlling fluid flow from a hydraulic pump to a hydraulic power steering mechanism, said apparatus comprising:
   orifice means, through which fluid from the pump flows to the steering mechanism, for generating a hydraulic control signal proportional to the fluid flow rate through said orifice means;
   flow control valve means for bypassing fluid flow away from the steering mechanism in response to said hydraulic control signal; and
   control means for modifying said hydraulic control signal including a pilot fluid circuit between the pump and said orifice means and a solenoid operated valve means in said pilot fluid circuit and operable in response to a secondary control signal.

2. The apparatus of claim 1 wherein said control means further includes a speed sensing means for monitoring the speed of the vehicle and for generating said secondary control signal in response to the speed of the vehicle.

3. The apparatus of claim 2 wherein said secondary control signal is a pulse width modulated signal with a duty cycle proportional to vehicle speed.

4. A vehicle power steering apparatus comprising:
   a pump for providing hydraulic fluid under pressure;
   a hydraulic assist steering motor in communication with said pump for steering vehicle wheels;
   flow control orifice means for generating a hydraulic control signal proportional to the fluid flow rate between said pump and said steering motor;
   flow control valve means for bypassing fluid away from said steering motor in response to said hydraulic control signal;
   speed measuring means for measuring speed of the vehicle and for generating a signal indicative thereof; and
   control means for modifying said hydraulic control signal in response to said signal from said speed measuring means.

5. The apparatus of claim 4 wherein said control means includes a pilot fluid circuit between said pump and said flow control orifice means and a solenoid operated valve in said pilot fluid circuit, said control means further including means for generating an electrical control signal in response to the signal from said speed measuring means to control said solenoid operated valve.

6. The apparatus of claim 5 wherein said electrical control signal is a pulse width modulated signal having a duty cycle proportional with the signal from said speed measuring means.

7. A vehicle power steering apparatus comprising:
   a pump for providing hydraulic fluid under pressure;
   a power steering mechanism operatively connected to a steering wheel of a vehicle and the steerable wheels of the vehicle;
   a main conduit connected to said pump and said power steering mechanism for communicating fluid from the pump to the power steering mechanism;
   flow control orifice means located in said main conduit for generating a hydraulic control signal in response to the fluid flow rate through said flow control orifice means;
   bypass valve means connected to the pump and to a reservoir for bypassing fluid in response to said hydraulic control signal;
   conduit means for communicating said hydraulic control signal to said bypass valve means;
   solenoid operated valve means operatively connected to said pump and to said conduit means for modifying said hydraulic control signal responsive to a solenoid control signal; and
   electronic control means for generating said solenoid control signal in response to a secondary control signal.

8. The apparatus of claim 7 wherein said apparatus includes means for generating said secondary control signal having a characteristic responsive to vehicle speed.

* * * * *